(12) United States Patent  (10) Patent No.: US 12,434,817 B2
Hinson et al.  (45) Date of Patent: Oct. 7, 2025

(54) WINGLET TRAILING EDGE VENTING

(71) Applicant: Textron Aviation Inc., Wichita, KS (US)

(72) Inventors: Bryan C. Hinson, Wichita, KS (US); Corey W. Hagemeister, Wichita, KS (US); Robert G Wiegers, Wichita, KS (US); Kelly R Laflin, Wichita, KS (US)

(73) Assignee: TEXTRON INNOVATIONS INC., Providence, RI (US)

( * ) Notice: Subject to any disclaimer, the term of this patent is extended or adjusted under 35 U.S.C. 154(b) by 0 days.

(21) Appl. No.: 18/463,066

(22) Filed: Sep. 7, 2023

(65) Prior Publication Data

US 2025/0083804 A1  Mar. 13, 2025

(51) Int. Cl.
*B64C 21/02* (2006.01)

(52) U.S. Cl.
CPC .................................. *B64C 21/025* (2013.01)

(58) Field of Classification Search
CPC ..... B64C 23/065; B64C 23/069; B64C 21/00; B64C 21/025; B64C 21/04
See application file for complete search history.

(56) References Cited

U.S. PATENT DOCUMENTS

| | | | | |
|---|---|---|---|---|
| 1,775,757 A | * | 9/1930 | Gay | B63B 1/38 |
| | | | | 244/55 |
| 3,920,203 A | * | 11/1975 | Moorehead | F02K 1/70 |
| | | | | 244/81 |
| 5,158,251 A | * | 10/1992 | Taylor | B64C 23/065 |
| | | | | 244/207 |
| 6,135,395 A | * | 10/2000 | Collett | B64C 9/22 |
| | | | | 244/209 |
| 7,708,229 B1 | * | 5/2010 | Angle, II | B64C 21/08 |
| | | | | 244/206 |
| 8,152,109 B2 | * | 4/2012 | Silich | B64C 15/14 |
| | | | | 244/199.4 |
| 9,239,039 B2 | * | 1/2016 | Herr | F03D 7/022 |
| 9,487,287 B2 | | 11/2016 | Wood | |
| 10,883,372 B2 | * | 1/2021 | Ferber | F01D 25/12 |
| 2013/0320150 A1 | * | 12/2013 | Reckzeh | B64C 21/02 |
| | | | | 244/199.4 |
| 2019/0031322 A1 | * | 1/2019 | Micros | B64C 21/04 |
| 2020/0032769 A1 | * | 1/2020 | Thomas | F03D 3/061 |
| 2020/0094947 A1 | * | 3/2020 | Commis | B64C 23/069 |
| 2020/0339248 A1 | * | 10/2020 | Mbodj | B64C 21/06 |
| 2020/0391852 A1 | * | 12/2020 | Logan | B64C 21/04 |
| 2023/0009263 A1 | * | 1/2023 | Mbodj | B64C 21/025 |

\* cited by examiner

*Primary Examiner* — Joshua J Michener
*Assistant Examiner* — Cindi M Curry
(74) *Attorney, Agent, or Firm* — Nixon & Vanderhye, P.C.

(57) ABSTRACT

Airfoil venting systems are provided which include an airfoil (e.g., a winglet or an aircraft wing) having leading and trailing edges and an internal channel adapted to being fluid-connected to an on-board aircraft system which in use requires air to be exhausted. A series of venting apertures are positioned on at least a portion of the trailing edge of the airfoil and fluid-connected to the internal channel whereby air from the on-board aircraft system can be exhausted therethrough.

7 Claims, 2 Drawing Sheets

WINGLET TRAILING EDGE VENTING

FIELD

The embodiments disclosed herein relate generally to airfoils, such as aircraft wings and winglets, provided with venting systems. In preferred forms, the embodiments disclosed herein relate to airfoils that include trailing edge vent systems.

BACKGROUND

Certain onboard aircraft systems, such as aircraft cabin ventilation and bleed air ice protection systems, require that air be exhausted during use. Typically, the exhaust air associated with such onboard systems is discharged to the ambient environment through vents or louvers located on the lower surface of the airfoil. However, discharging exhaust air in such a manner creates aerodynamic disruption and attendant drag.

While the aerodynamic disruption and drag can be minimized by locating the discharge vents at an outboard section of the airfoil, there still exists a need for improvement. It is towards fulfilling such a need that the embodiments disclosed herein are directed.

SUMMARY

The airfoil venting systems according to the embodiments disclosed herein will generally comprise an airfoil having leading and trailing edges, and an internal channel adapted to being fluid-connected to an on-board aircraft system which in use requires air to be exhausted. A series of venting apertures are positioned on at least a portion of the trailing edge of the airfoil and fluid-connected to the internal channel whereby air from the on-board aircraft system can be exhausted therethrough.

Some embodiments will include a manifold cavity internally of the airfoil which fluid connects the internal channel to the venting apertures. The airfoil may be, for example, a winglet or an outboard section of a wing. In those embodiments where the airfoil is a winglet, the venting apertures may be positioned along an inboard, an outboard and/or an intermediate section of the trailing edge of the winglet. When the airfoil is a wing, the venting apertures may be positioned along an outboard section of the trailing edge of the wing.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

DETAILED DESCRIPTION OF EMBODIMENTS

Figure 1:
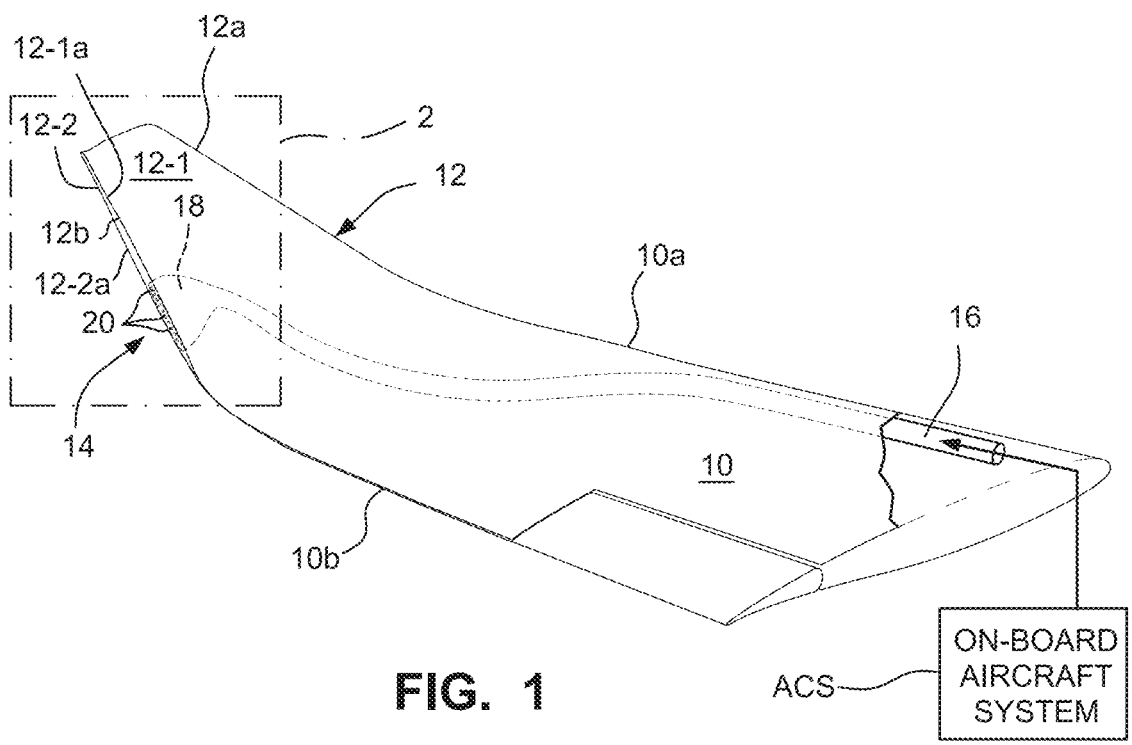
FIG. 1 is a schematic perspective view of an airfoil that includes an embodiment of the trailing edge venting system according to the present invention.
Figure 2:
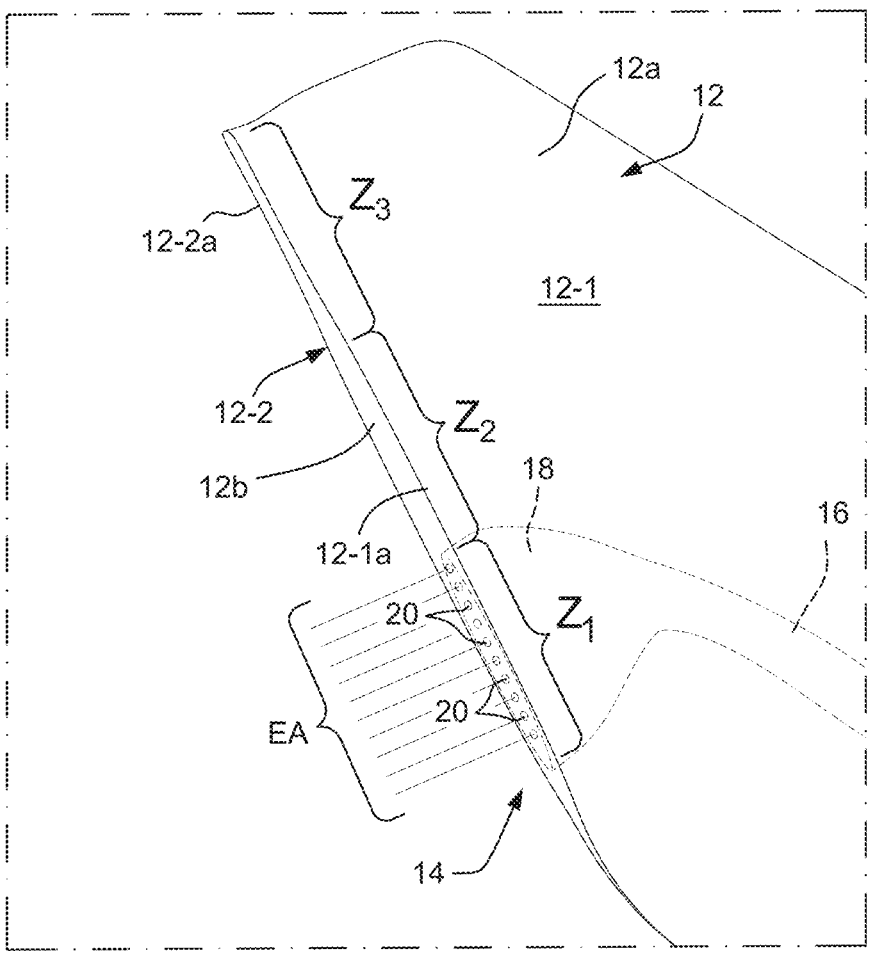
FIG. 2 is an enlarged view of the venting system as shown in FIG. 1.

Accompanying FIGS. 1 and 2 depict a port wing 10 which includes leading and trailing edges 10a, 10b, respectively. The port wing 10 terminates in an associated winglet 12 which includes upper and lower winglet surfaces 12-1, 12-2, respectively, that define a leading winglet edge 12a. A substantially planar trailing edge surface 12b joins the trailing edges 12-1a, 12-2a of the upper and lower winglet surfaces 12-1, 12-2, respectively. It will be appreciated in this regard that although only a port wing is depicted the discussion hereinbelow equally applies to the starboard wing (not shown) as the latter is a mirror image of the former. The wing 10 is provided with venting system 14 that includes an internal channel 16 which terminates in an internal manifold cavity 18 and an aligned series of vent apertures 20 in fluid communication with the manifold cavity 18. The series of vent apertures 20 is positioned within the trailing edge surface 12b of the winglet 12 between the trailing edges 12-1a, 12-2a of the upper and lower winglet surfaces 12-1, 12-2, respectively, so as to be linearly aligned with one another along at least a portion of the trailing edge surface 12b of the winglet 12. In such a manner, the linearly aligned series of vent apertures 20 serves to discharge exhaust air EA in an aftward direction.

The internal channel 16 receives air to be exhausted from an onboard aircraft system ACS which may, for example, be a cabin environmental ventilation system or a thermal anti-icing system using bleed air from the compressor section of a turbine engine. Although the internal channel 16 is depicted schematically as a tube or conduit, those in this art will realize that the channel 16 may be in the form of a cavity that is defined spanwise within the leading edge of the wing 10.

Figure 3:
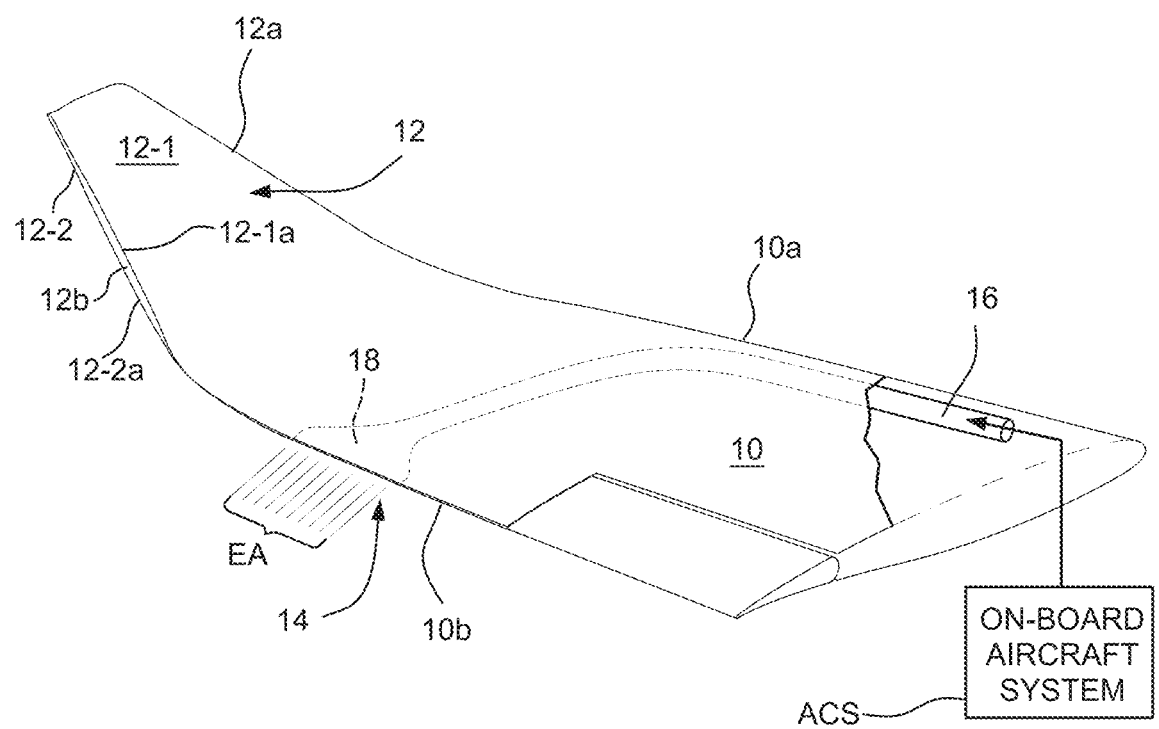
FIG. 3 is a schematic perspective view of another embodiment of the trailing edge venting system according to the present invention.

As is perhaps better shown in FIG. 2, the venting apertures 20 are depicted as being linearly aligned along an inboard section Z1 of the trailing edge surface 12b of the winglet 12. However, the venting apertures 20 may alternatively or additionally be provided along an intermediate section Z2 and/or an outboard section Z3 of the winglet 12 as may be required for proper venting of the exhaust air supplied by the onboard aircraft system ACS. An alternative embodiment is depicted in FIG. 3 as allowing exhaust air (schematically identified by the reference EA) through aligned venting apertures (not shown) in the trailing edge 10b of the wing 10.

It is believed that less aerodynamic disturbances are realized by venting exhaust air through the venting apertures 20 linearly aligned along at least a portion of the planar trailing edge surface 12b of the winglet 12 and/or along an outboard portion of the trailing edge 10b of the wing 10. Moreover, the exhaust air vented from the venting apertures 20 at the trailing edge surface 12b of the winglet 12 and/or the trailing edge 10b of the wing 10, respectively, may contribute to added thrust thereby improving aircraft performance.

While reference has been made to particular embodiments of the invention, various modifications within the skill of those in the art may be envisioned. Therefore, it is to be understood that the invention is not to be limited to the disclosed embodiments, but on the contrary, is intended to cover various modifications and equivalent arrangements included within the spirit and scope thereof.

What is claimed is:

1. A winglet airfoil venting system comprising:
a winglet airfoil having upper and lower airfoil surfaces defining leading and trailing edges, and a planar trailing edge surface joining the trailing edges of the upper and lower airfoil surfaces;
an internal channel adapted to being fluid-connected to an onboard aircraft system which in use requires air to be exhausted; and
a series of venting apertures fluid-connected to the internal channel, the venting apertures being formed in and linearly aligned along at least a portion of the planar trailing edge surface of the winglet airfoil, wherein
exhaust air from the onboard aircraft system is discharged rearwardly from the trailing edge surface of the winglet airfoil through the linearly aligned venting apertures.

2. The airfoil venting system according to claim 1, further comprising an internal manifold cavity fluid connecting the internal channel to the venting apertures.

3. The airfoil venting system according to claim 1, wherein the venting apertures are positioned along an inboard, an outboard and/or an intermediate section of the trailing edge surface of the winglet airfoil.

4. An aircraft comprising a winglet airfoil which includes the winglet airfoil venting system according to claim 1.

5. An aircraft comprising:
an onboard aircraft system which in use requires air to be exhausted;
a winglet airfoil having upper and lower airfoil surfaces defining leading and trailing edges, and a planar trailing edge surface joining the trailing edges of the upper and lower airfoil surfaces; and
a venting system to vent exhaust air from the onboard aircraft system from the planar trailing edge surface of the winglet airfoil, wherein the venting system comprises:
(i) an internal channel internally provided in the winglet airfoil which is fluid-connected to the onboard aircraft system to receive exhaust air therefrom; and
(ii) a series of venting apertures fluid-connected to the internal channel, the venting apertures being formed in and linearly aligned along at least a portion of the planar trailing edge surface of the winglet airfoil, wherein
exhaust air from the onboard aircraft system is discharged rearwardly from the planar trailing edge surface of the winglet airfoil through the linearly aligned venting apertures.

6. The aircraft according to claim 5, wherein the airfoil venting system further comprises an internal manifold cavity fluid connecting the internal channel to the venting apertures.

7. The aircraft according to claim 5, wherein the venting apertures are formed in and linearly positioned along an inboard, an outboard and/or an intermediate section of the planar trailing edge surface of the winglet airfoil.

* * * * *